US012397908B1

United States Patent
Wang et al.

(10) Patent No.: US 12,397,908 B1
(45) Date of Patent: Aug. 26, 2025

(54) SENSORLESS PROPELLER DAMAGE DETECTION SYSTEMS AND METHODS

(71) Applicant: Amazon Technologies, Inc., Seattle, WA (US)

(72) Inventors: Xiaoqi Wang, Bellevue, WA (US); Lizon Maharjan, Seattle, WA (US); Tausif Husain, Maple Valley, WA (US); Sheverria Antony Aikens, Mill Creek, WA (US); Frederic Pierre Lacaux, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 18/333,835

(22) Filed: Jun. 13, 2023

(51) Int. Cl.
*B64C 27/00* (2006.01)
*B64U 10/16* (2023.01)
*B64U 50/19* (2023.01)

(52) U.S. Cl.
CPC ............ *B64C 27/007* (2013.01); *B64U 10/16* (2023.01); *B64U 50/19* (2023.01)

(58) Field of Classification Search
CPC ........ B64C 27/007; B64U 10/16; B64U 50/19
See application file for complete search history.

(56) References Cited

U.S. PATENT DOCUMENTS

| | | | |
|---|---|---|---|
| 9,613,539 B1* | 4/2017 | Lindskog | H02K 7/183 |
| 12,252,260 B2* | 3/2025 | Tsaliah | B64D 17/80 |
| 2019/0106206 A1* | 4/2019 | Shi | B64U 30/295 |
| 2023/0139693 A1* | 5/2023 | Hofi | B64U 50/19 |
| | | | 701/3 |
| 2023/0202652 A1* | 6/2023 | Convert | B64C 39/08 |
| | | | 244/7 R |

\* cited by examiner

*Primary Examiner* — Ramsey Refai
(74) *Attorney, Agent, or Firm* — Athorus, PLLC

(57) ABSTRACT

Sensorless propeller damage detection systems and methods may receive and process motor quadrature-axis currents to extract current ripples and fast average current values. In addition, the current ripples and fast average current values may be further processed to generated normalized rms (root-mean-square) values of the current ripples. Further, the calculated values may be compared to one or more threshold values over a time duration to determine whether a propeller is damaged. In this manner, the sensorless propeller damage detection systems and methods may quickly, reliably, and accurately detect propeller damage without any additional sensors or dedicated hardware and with low computational cost, while also minimizing false positive determinations of propeller damage.

20 Claims, 7 Drawing Sheets

SENSORLESS PROPELLER DAMAGE DETECTION SYSTEMS AND METHODS

BACKGROUND

Unmanned aerial vehicles ("UAV") are continuing to increase in use. For example, UAVs are often used by hobbyists to obtain aerial images of buildings, landscapes, etc. While there are many beneficial uses of these vehicles, propulsion mechanisms of such vehicles need to be reliably, precisely, and accurately controlled over a wide range of operating parameters, and damage to one or more propulsion mechanisms may result in degraded operation of vehicles. Accordingly, there is a need for systems and methods to provide reliable, precise, and accurate sensorless propeller damage detection, in order to maintain safe operation of aerial vehicles.

DETAILED DESCRIPTION

Figure 1:
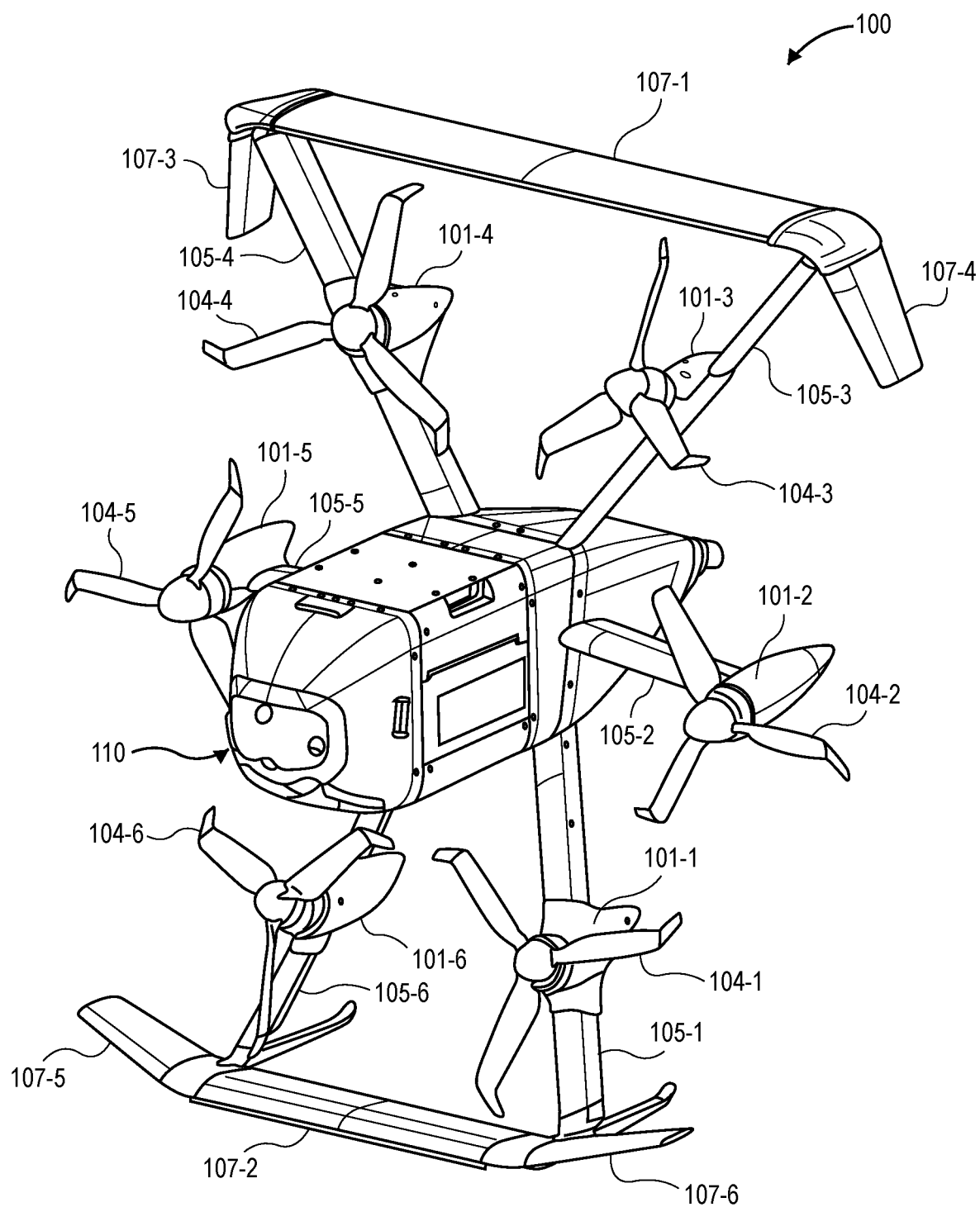
FIG. 1 illustrates a perspective view of an example aerial vehicle with a partial ring wing, in accordance with implementations of the present disclosure.

As is set forth in greater detail below, implementations of the present disclosure are directed to systems and methods for sensorless propeller damage detection.

During operation of aerial vehicles, propellers may be damaged due to various causes, including impact by external objects such as tree branches, birds, or other structures or objects. One or more damaged propellers may lead to various effects or consequences, including reduced thrust or loss of thrust, degraded control or loss of control, structural damage due to vibration or imbalance, and/or various other effects. Conventional methods to detect propeller damage may require additional sensors or components, including accelerometers, piezo-electric sensors, imaging sensors, or other types of sensors.

In example embodiments described herein, sensorless propeller damage detection algorithms, processes, or techniques may quickly, precisely, and reliably detect propeller damage by detecting and processing current ripples that may be induced during aerial vehicle operation. Generally, the sensorless propeller damage detection algorithms, processes, and techniques may be applied to implementations of aerial vehicles having at least one motor arm, support arm, spar, wing, structure, surface, or component that is positioned within an area or volume of thrust generation of the one or more propulsion mechanisms including motors and propellers. The presence of at least some structure, component, motor arm, or other surfaces within an area or volume of thrust generation of the motors and propellers may accentuate, amplify, or augment current ripples that may be induced during operation of the motors and propellers.

For example, when one or more blades of a propeller are damaged, an unbalanced thrust may be generated during operation of the motor and damaged propeller, and the unbalanced thrust may interact with the structure, component, motor arm, or other surfaces within an area or volume of thrust generation. Such unbalanced thrust may generate or induce torque ripples upon the motor shaft coupled between the motor and damaged propeller. Further, the torque ripples may cause or induce current ripples associated with operation of the motor and damaged propeller, which may be associated with a motor quadrature-axis current $I_q$. In addition, the induced current ripples may generally have a linear relationship with the induced torque ripples, such that as the magnitude and frequency of the torque ripples increase, the magnitude and frequency of the induced current ripples may also correspondingly increase.

In example embodiments, the sensorless propeller damage detection algorithms, processes, or techniques may comprise high frequency noise filtering, current ripples extraction and processing, current average value determination and processing, current ripples normalization, and comparisons with various thresholds related to current ripples, current average value, and time. Upon meeting the various thresholds, damage to a propeller may be determined. In additional example embodiments, the sensorless propeller damage detection algorithms, processes, or techniques may be triggered or initiated in response to detecting impact upon one or more propellers during operation of an aerial vehicle. Further, various control or mitigation strategies may be executed or implemented to maintain safe operation of aerial vehicles having one or more damaged propellers.

FIG. 1 illustrates a perspective view of an example aerial vehicle 100 with a partial ring wing, in accordance with implementations of the present disclosure.

The aerial vehicle 100 includes six propulsion mechanisms including motors 101-1, 101-2, 101-3, 101-4, 101-5, and 101-6 and propellers 104-1, 104-2, 104-3, 104-4, 104-5, and 104-6 spaced about a fuselage 110 of the aerial vehicle 100. While the propulsion mechanisms may include motors 101 and associated propellers 104 in the implementations described herein, in other implementations, other forms of propulsion may be utilized as the propulsion mechanisms. For example, one or more of the propulsion mechanisms of the aerial vehicle 100 may utilize fans, jets, turbojets, turbo fans, jet engines, and/or the like to maneuver the aerial vehicle. Generally described, a propulsion mechanism, as used herein, includes any form of propulsion mechanism that is capable of generating a force sufficient to maneuver the aerial vehicle, alone and/or in combination with other propulsion mechanisms. Furthermore, in selected implementations, propulsion mechanisms may be configured such that their individual orientations may be dynamically modified (e.g., change from vertical to horizontal flight orientation or any position therebetween). In addition, the terms propeller and propeller blade are used herein substantially interchangeably with reference to the disclosed implementations, with the understanding that a propeller may comprise one or more propeller blades.

Likewise, while the examples herein describe the propulsion mechanisms being able to generate force in either direction, e.g., pulling or pushing directions, in some implementations, the propulsion mechanisms may only generate force in a single direction. However, the orientation of the propulsion mechanisms may be adjusted so that the force can be oriented in a positive direction, a negative direction, and/or any other direction.

In this implementation, the aerial vehicle 100 may include a partial ring wing 107 having an approximately hexagonal shape that extends partially around a perimeter of the aerial vehicle 100. In the illustrated example, the partial ring wing may include an upper section or segment 107-1, a lower section or segment 107-2, and partial side sections or segments 107-3, 107-4, 107-5, and 107-6 that may be joined at opposing ends of the upper or lower sections 107-1, 107-2 to form the partial ring wing 107 around the aerial vehicle 100. Each segment of the partial ring wing 107 may include an airfoil shape to produce lift when the aerial vehicle is oriented as illustrated in FIG. 1 and moving in a direction that is substantially horizontal. As illustrated, and discussed further below, the partial ring wing may be positioned at an angle with respect to the fuselage 110 such that the lower segment 107-2 of the partial ring wing acts as a front wing as it is toward the front of the aerial vehicle when oriented as shown and moving in a horizontal direction. The upper segment 107-1 of the partial ring wing, which may have a longer chord length than the lower segment 107-2 of the partial ring wing 107, is farther back and thus acts as a rear wing.

The partial ring wing 107 may be secured to the fuselage 110 by motor arms 105. In this example, four motor arms 105-1, 105-3, 105-4, and 105-6 may be coupled to the fuselage 110 at one end, and extend from the fuselage 110 and couple to the partial ring wing 107 at a second end, thereby securing the partial ring wing 107 to the fuselage 110. In addition, motor arms 105-2, 105-5 may also extend from the fuselage 110 and couple to or support respective motors 101-2, 101-5 and propellers 104-2, 104-5, but motor arms 105-2, 105-5 may not couple to the partial ring wing 107.

In some implementations, the aerial vehicle may also include one or more stabilizer fins that extend from the fuselage 110 to the partial ring wing 107. The stabilizer fins may also have an airfoil shape. The stabilizer fins may extend generally vertically from the fuselage 110 to portions of the partial ring wing 107, e.g., upper segment 107-1 and/or lower segment 107-2. In other implementations, the stabilizer fins may be at other positions and/or orientations.

In further implementations, one or more of the stabilizer fins may extend from the fuselage 110 and not couple to the partial ring wing 107 or may extend from the partial ring wing 107 and not couple to the fuselage 110. In some implementations, one or more stabilizer fins may extend from the exterior of the partial ring wing 107, one or more stabilizer fins may extend from the interior of the partial ring wing 107, one or more stabilizer fins may extend from the fuselage 110, and/or one or more stabilizer fins may extend from the fuselage 110 and couple to the interior of the partial ring wing 107.

The fuselage 110, motor arms 105, stabilizer fins, and partial ring wing 107 of the aerial vehicle 100 may be formed of any one or more suitable materials, such as graphite, carbon fiber, plastics, metals, aluminum, steel, other materials, or combinations thereof.

Each of the propulsion mechanisms may be coupled to a respective motor arm 105 (or propulsion mechanism arm) such that the propulsion mechanism is substantially contained within a perimeter of the partial ring wing 107. For example, motor 101-1 and propeller 104-1 are coupled to motor arm 105-1, motor 101-2 and propeller 104-2 are coupled to motor arm 105-2, motor 101-3 and propeller 104-3 are coupled to motor arm 105-3, motor 101-4 and propeller 104-4 are coupled to motor arm 105-4, motor 101-5 and propeller 104-5 are coupled to motor arm 105-5, and motor 101-6 and propeller 104-6 are coupled to motor arm 105-6. In the illustrated example, each motor 101-1, 101-3, 101-4, 101-6 and corresponding propeller 104-1, 104-3, 104-4, 104-6 may be coupled at an approximate mid-point of the respective motor arm 105-1, 105-3, 105-4, and 105-6 between the fuselage 110 and the partial ring wing 107. In addition, motor 101-2 and propeller 104-2 may be coupled toward an end of motor arm 105-2, and motor 101-5 and propeller 104-5 may be coupled toward an end of motor arm 105-5. In other implementations, the propulsion mechanisms may be coupled at other locations along respective motor arms. Likewise, in some implementations, some of the propulsion mechanisms may be coupled to a mid-point of respective motor arms and some of the propulsion mechanisms may be coupled at other locations along respective motor arms (e.g., closer toward the fuselage 110 or closer toward the partial ring wing 107).

As illustrated, the propulsion mechanisms may be oriented at different angles with respect to each other. For example, motors 101-2, 101-5 and propellers 104-2, 104-5 may be aligned with the fuselage 110 such that the force generated by each of the motors 101-2, 101-5 and propellers 104-2, 104-5 is in-line or in the same direction or orientation as the fuselage 110. In the illustrated example, the aerial vehicle 100 is oriented for horizontal flight such that the fuselage 110 is oriented horizontally in the direction of travel. In such an orientation, the motors 101-2, 101-5 and propellers 104-2, 104-5 provide horizontal forces, also referred to herein as thrusting forces and act as thrusting propulsion mechanisms.

In comparison to motors 101-2, 101-5 and propellers 104-2, 104-5, each of motors 101-1, 101-3, 101-4, 101-6 and propellers 104-1, 104-3, 104-4, 104-6 may be offset or angled with respect to the orientation of the fuselage 110. When the aerial vehicle 100 is oriented horizontally as shown in FIG. 1 for horizontal flight, the motors 101-1, 101-3, 101-4, 101-6 and propellers 104-1, 104-3, 104-4, 104-6 may be used as propulsion mechanisms, providing thrust in a non-horizontal direction to cause the aerial vehicle to pitch, yaw, roll, heave and/or sway. In other implementations, during horizontal flight, the motors 101-1, 101-3, 101-4, 101-6 and propellers 104-1, 104-3, 104-4, 104-6 may be disabled such that they do not produce any forces, and the aerial vehicle 100 may be propelled aerially in a horizontal direction as a result of the lifting force from the aerodynamic shape of the partial ring wing 107 and the horizontal thrust produced by the thrusting propulsion mechanisms, e.g., motors 101-2, 101-5 and propellers 104-2, 104-5.

In some implementations, one or more segments of the partial ring wing 107 may include ailerons, control surfaces, and/or trim tabs that may be adjusted to control the aerial flight of the aerial vehicle 100. For example, one or more ailerons, control surfaces, and/or trim tabs may be included on the upper segment 107-1 of the partial ring wing 107, and/or one or more ailerons, control surfaces, and/or trim tabs may be included on the lower segment 107-2 of the partial ring wing 107. Further, one or more ailerons, control surfaces, and/or trim tabs may also be included on one or more of the side segments 107-3, 107-4, 107-5, 107-6. The ailerons, control surfaces, and/or trim tabs may be operable to control the pitch, yaw, and/or roll of the aerial vehicle during horizontal flight when the aerial vehicle 100 is oriented as illustrated in FIG. 1.

The angle of orientation of each of the motors 101 and propellers 104 may vary for different implementations. Likewise, in some implementations, the offset of the motors 101 and propellers 104 may each be the same, with some oriented in one direction and some oriented in another direction, each oriented different amounts, and/or in different directions.

In the illustrated example of FIG. 1, each propulsion mechanism may be oriented approximately thirty degrees with respect to the position of each respective motor arm 105-1, 105-2, 105-3, 105-4, 105-5, and 105-6. In addition, the direction of orientation of the propulsion mechanisms may be such that pairs of propulsion mechanisms are oriented toward one another. For example, a direction of thrust generation of the motor 101-1 and propeller 104-1 may be oriented approximately thirty degrees about the first motor arm 105-1 toward a direction of thrust generation of the motor 101-6 and propeller 104-6 that may also be oriented approximately thirty degrees about the sixth motor arm 105-6. Likewise, a direction of thrust generation of the motor 101-2 and propeller 104-2 may be oriented approximately thirty degrees about the second motor arm 105-2 and toward a direction of thrust generation of the motor 101-3 and propeller 104-3 that may also be oriented approximately thirty degrees about the third motor arm 105-3. Finally, a direction of thrust generation of the motor 101-4 and propeller 104-4 may be oriented approximately thirty degrees about the fourth motor arm 105-4 and toward a direction of thrust generation of the motor 101-5 and propeller 104-5 that may also be oriented approximately thirty degrees about the fifth motor arm 105-5. As illustrated, motors 101-2, 101-5 and propellers 104-2, 104-5, which are on opposing sides of the fuselage 110, may be aligned and oriented in a same first direction (in this example, horizontal). Motors 101-3, 101-6 and propellers 104-3, 104-6, which are on opposing sides of the fuselage 110, may be aligned and oriented in a same second direction, which is angled compared to the first direction. Motors 101-1, 101-4 and propellers 104-1, 104-4, which are on opposing sides of the fuselage 110, may be aligned and oriented in a same third direction, which is angled compared to the first direction and the second direction.

The example aerial vehicle 100 may also include a control system, including one or more processors, memories, controllers, power supplies, communication devices or interfaces, sensors, input/output devices, or other components. In addition, the control system may include, execute, or implement the sensorless propeller damage detection algorithms, processes, and techniques described herein. Further details of an example control system of an aerial vehicle are described herein at least with respect to FIG. 7.

Although FIG. 1 illustrates an example implementation of an aerial vehicle 100, other example implementations of aerial vehicles may include the same, similar, or different combinations of various components described herein. For example, other aerial vehicles may include other numbers, configurations, or arrangements of motors, propellers, motor arms, wing segments or sections, and/or other components.

In example embodiments, the sensorless propeller damage detection algorithms, processes, and techniques may be applied to various implementations of aerial vehicles. Generally, the sensorless propeller damage detection algorithms, processes, and techniques may be applied to implementations of aerial vehicles having at least one motor arm, support arm, spar, wing, structure, surface, or component that is positioned within an area or volume of thrust generation of the one or more propulsion mechanisms. In the example aerial vehicle 100 described herein, at least a portion of the motor arms 105 extends within, into, and/or across an area or volume of thrust generation of the motors 101 and corresponding propellers 104.

The presence of at least some structure, component, motor arm, or other surfaces within an area or volume of thrust generation of the motors 101 and corresponding propellers 104 may accentuate, amplify, or augment current ripples that may be induced during operation of the motors and propellers. By detection and processing of such current ripples using the propeller damage detection algorithms, processes, and techniques described herein, damage to propellers may be detected more precisely, accurately, and quickly, in order to maintain safe operation of aerial vehicles.

Figure 2:
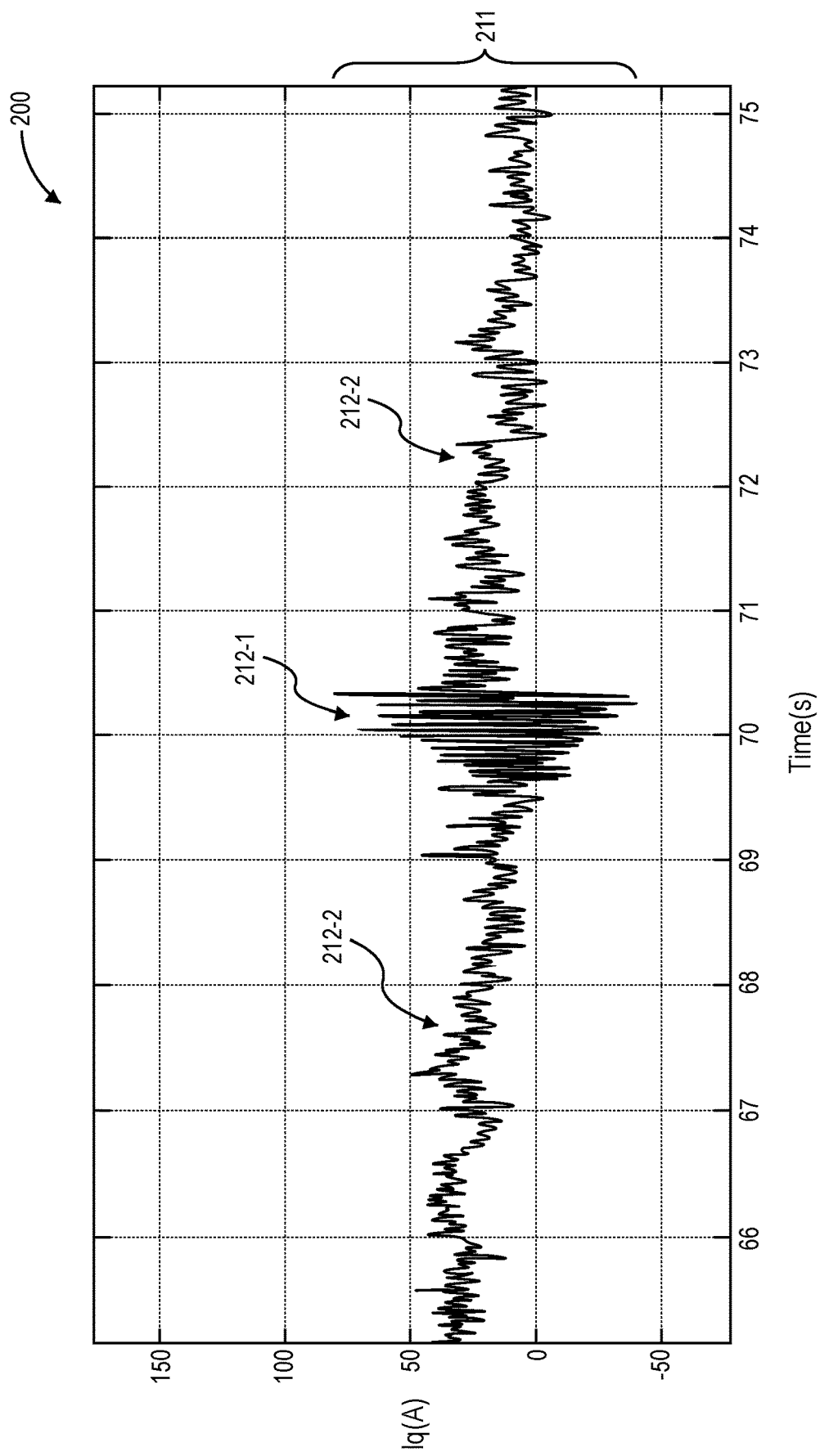
FIG. 2 illustrates an example graph of current ripples associated with an undamaged propeller during operation of an aerial vehicle, in accordance with implementations of the present disclosure.

FIG. 2 illustrates an example graph 200 of current ripples associated with an undamaged propeller during operation of an aerial vehicle, in accordance with implementations of the present disclosure.

As shown in FIG. 2, induced current 211, including current ripples 212-1, 212-2, may be measured or detected in association with an undamaged propeller during operation of an aerial vehicle. For example, current ripples 212-1 may be associated with changes in commanded speed, and current ripples 212-2 may be associated with substantially steady or continuous commanded speed. As illustrated, during normal flight or navigation operations of an aerial vehicle, changes in commanded speed, e.g., motor and/or propeller revolutions per minute (rpm), may induce current ripples 212-1 having relatively greater magnitude that can be measured or detected. Based on a bandwidth value of a motor speed controller, induced current ripples 212-1 having associated magnitude and/or frequency values may be detected during execution of such speed changes for undamaged propellers. In addition, during substantially steady or continuous speeds of a motor and propeller, e.g., not associated with changes in commanded speed, current ripples 212-2 having relatively lesser magnitude may be measured or detected.

For an example motor speed controller having a bandwidth value of approximately 16 Hz, the current ripples induced by speed changes during normal operation of an undamaged propeller may be in the range of approximately 10 Hz to approximately 20 Hz. In other example embodiments, the induced current ripples may have other frequency values or ranges corresponding to various bandwidth values of other motor speed controllers.

In addition, the induced current ripples may have a magnitude and frequency that vary directly with the commanded speed, e.g., current ripples may have greater magnitude and frequency at higher commanded speeds, and current ripples may have lesser magnitude and frequency at lower commanded speeds. Because the magnitude and frequency of current ripples may vary directly with the commanded speed, accurate detection of current ripples may require a complex set of threshold values that are defined based on different commanded speeds. Further, current ripples having lesser magnitude and frequency at lower commanded speeds may also be more difficult to accurately detect or measure, thereby making determinations of propeller damage at lower speeds more challenging.

Thus, as further described herein, in order to avoid complex sets of threshold values and to reliably and accurately detect damaged propellers over various speed ranges, the induced current ripples may be processed and normalized to substantially remove or minimize the dependence upon commanded speed ranges.

Moreover, the current ripples induced by speed changes during normal operation of an undamaged propeller may have a relatively short time duration, e.g., approximately one second, approximately two seconds, or other time durations. For example, as shown in the example graph of FIG. 2, the induced current ripples 212-1 due to speed changes may have a time duration of approximately one second. In contrast, current ripples induced by a damaged propeller may have an extended time duration, e.g., starting from a time of initial damage and extending substantially continuously during further operation of the damaged propeller.

Thus, as further described herein, one or more threshold values related to time may be applied to the determinations of propeller damage, in order to prevent or minimize false positive determinations of propeller damage during normal operation of an aerial vehicle.

Figure 3A:
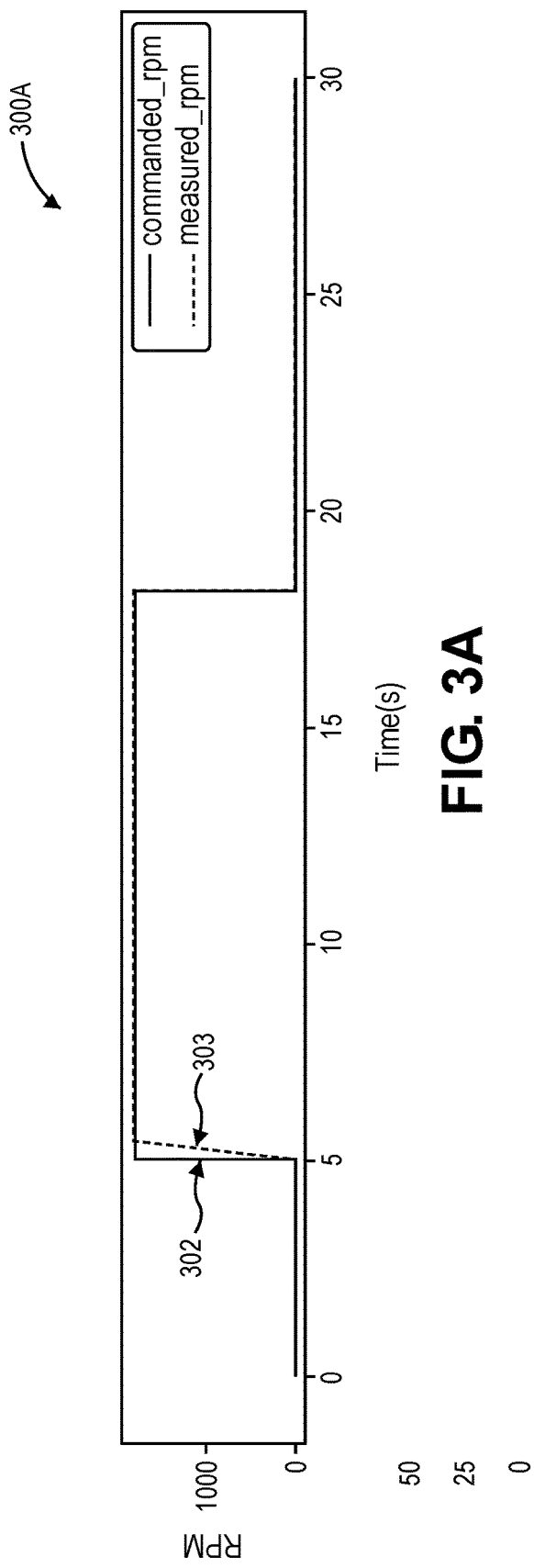
FIG. 3A illustrates an example graph of commanded and measured rpm associated with a damaged propeller during operation of an aerial vehicle, in accordance with implementations of the present disclosure.

FIG. 3A illustrates an example graph 300A of commanded and measured rpm associated with a damaged propeller during operation of an aerial vehicle, in accordance with implementations of the present disclosure.

As shown in FIG. 3A, a commanded speed or rpm 302, e.g., approximately 1800 rpm, may be instructed or commanded for a motor and damaged propeller, and a measured speed or rpm 303 may be detected or measured. As illustrated, the measured speed 303 substantially matches or corresponds to the commanded speed 302. The short time delay associated with the measured speed 303 reaching the commanded speed 302 at approximately the 5 second time point of FIG. 3A may be based on a bandwidth value of a motor speed controller that executes or implements the commanded speed 302. In the example described herein, an example bandwidth value of a motor speed controller may be approximately 16 Hz, although other bandwidth values may be associated with various other motor speed controllers.

Figure 3B:
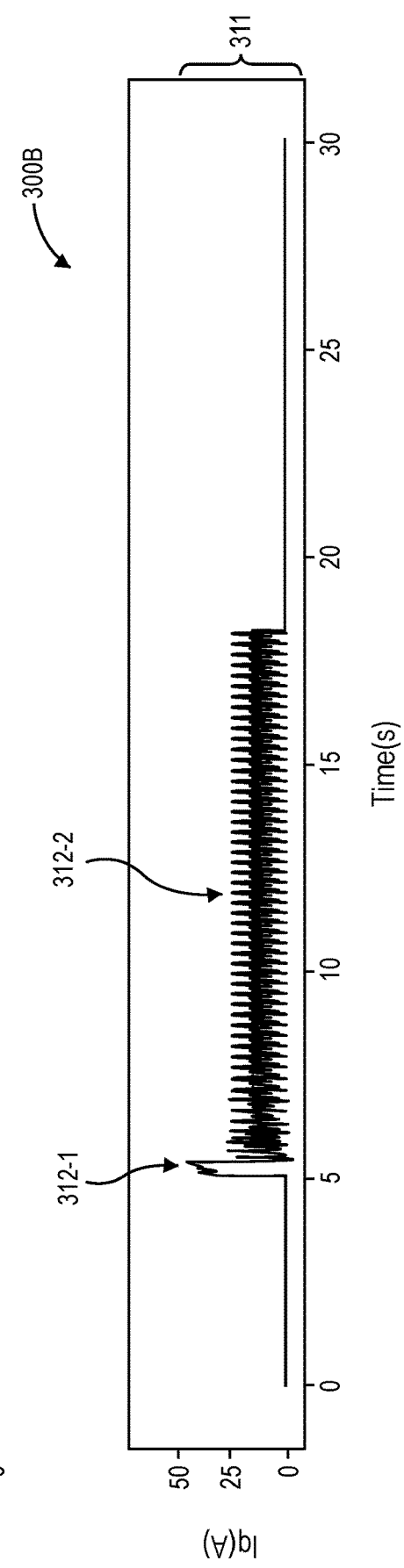
FIG. 3B illustrates an example graph of current ripples associated with a damaged propeller during operation of an aerial vehicle, in accordance with implementations of the present disclosure.

FIG. 3B illustrates an example graph 300B of current ripples associated with a damaged propeller during operation of an aerial vehicle, in accordance with implementations of the present disclosure.

As shown in FIG. 3B, induced current 311, including current ripples 312-1, 312-2, may be measured or detected in association with a damaged propeller during operation of an aerial vehicle. Similar to the description related to speed changes for an undamaged propeller with respect to FIG. 2, an initial current ripple 312-1 may be detected or measured as the motor speed controller commands or instructs the commanded speed for the motor and damaged propeller and as the measured speed of the motor and damaged propeller approaches the commanded speed at approximately the 5 second time point of FIG. 3B. The initial current ripple 312-1 may also have a relatively short time duration, e.g., approximately one second, approximately two seconds, etc.

However, in contrast to the description related to speed changes for an undamaged propeller with respect to FIG. 2, current ripples 312-2 for the damaged propeller may continue to be detected or measured while the measured speed substantially matches or corresponds to the commanded speed. For example, the current ripples 312-2 for the damaged propeller may continue from shortly after the 5 second time point and until the commanded speed goes to zero at approximately the 18 second time point of FIG. 3B. As a result, the current ripples 312-2 may be detected or measured during substantially steady or continuous operation of a motor and damaged propeller.

In example embodiments, the induced current ripples 312-2 may have a magnitude and frequency that vary directly with the commanded speed, e.g., current ripples may have greater magnitude and frequency at higher commanded speeds, and current ripples may have lesser magnitude and frequency at lower commanded speeds. Thus, as further described herein, in order to avoid complex sets of threshold values and to reliably and accurately detect damaged propellers over various speed ranges, the induced current ripples 312-2 may be processed and normalized to substantially remove or minimize the dependence upon commanded speed ranges.

Moreover, the induced current ripples 312-2 during operation of a motor and damaged propeller may have a relatively longer time duration, e.g., greater than approximately five seconds, greater than approximately seven seconds, or other time durations. For example, as shown in the example graph of FIG. 3B, the induced current ripples 312-2 for the motor and damaged propeller may have a time duration of approximately thirteen seconds, e.g., starting from a time of initial damage and extending substantially continuously during further operation of the damaged propeller. Thus, as further described herein, one or more threshold values related to time may be applied to the determinations of propeller damage, in order to quickly, reliably, and accurately make determinations of propeller damage during operation of an aerial vehicle.

Figure 4:
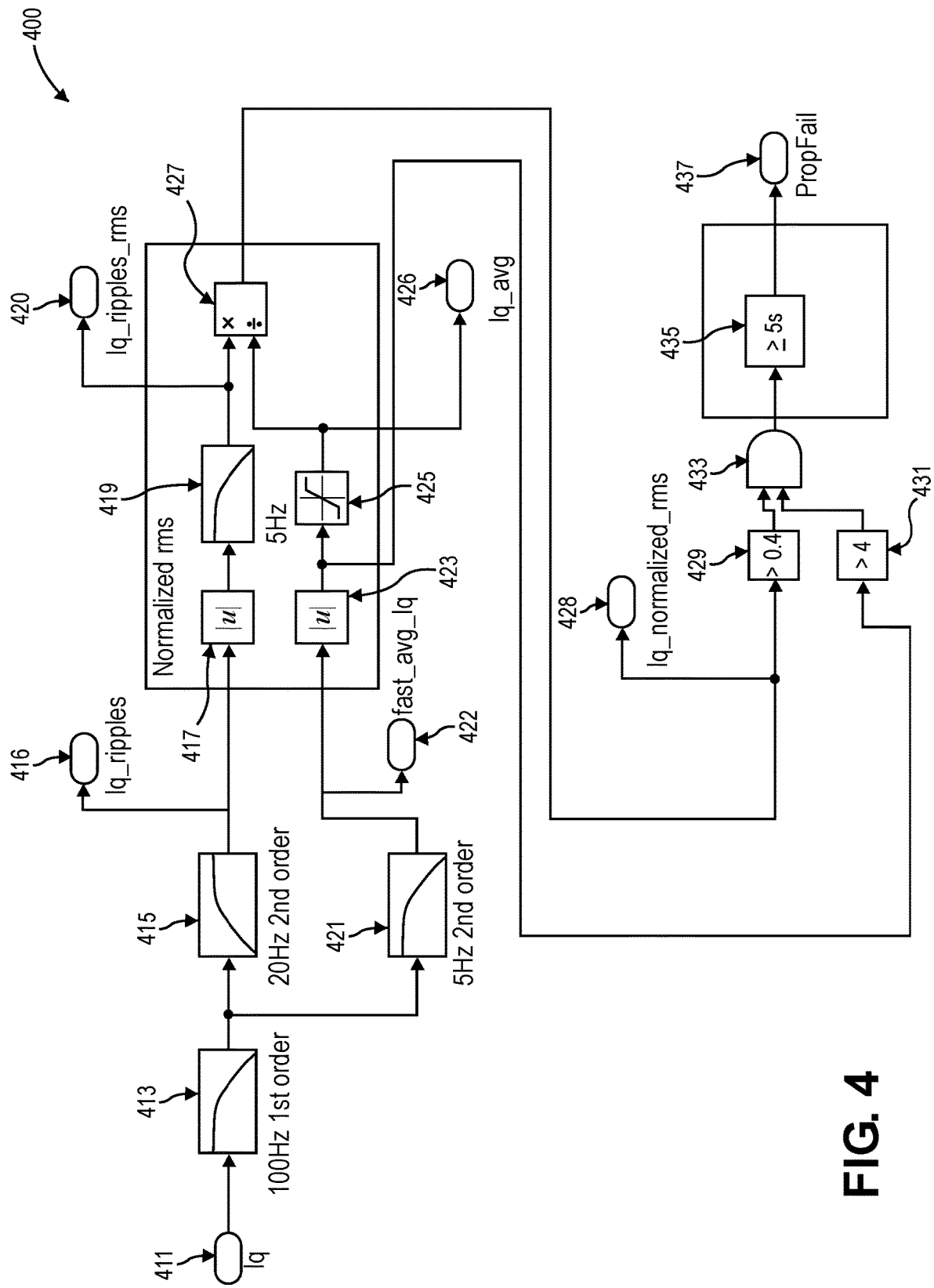
FIG. 4 illustrates an example propeller damage detection algorithm, in accordance with implementations of the present disclosure.

FIG. 4 illustrates an example propeller damage detection algorithm 400, in accordance with implementations of the present disclosure.

As shown in FIG. 4, the example propeller damage detection algorithm may receive as input a motor quadrature-axis current $I_q$ 411, e.g., measured $I_q$. The measured $I_q$ 411 may be calculated based on motor three phase current measurements and motor rotor position measurements or estimations. For example, motor three phase AC currents $I_a$, $I_b$, $I_c$ may be measured. Then, the three phase AC currents $I_a$, $I_b$, $I_c$ may be converted from the (a, b, c) reference frame to an orthogonal stationary $(\alpha, \beta)$ reference frame, e.g., using Clarke transforms. The measured currents may then be converted from the $(\alpha, \beta)$ reference frame to an orthogonal rotating (d, q) reference frame, e.g., using Park transforms. The resulting calculated currents may comprise a motor direct-axis current $I_d$ and a motor quadrature-axis current $I_q$ 411. For example, the induced currents 211, 311 described with respect to FIGS. 2 and 3B may comprise examples of measured and/or calculated motor quadrature-axis currents.

The measured $I_q$ 411 may first be processed by a first order low pass filter 413 to remove high frequency noise. For example, the first order low pass filter 413 may comprise a 100 Hz low pass filter. Other example embodiments may include low pass filters having other cutoff frequency values. The first order low pass filter 413 may filter or clean the measured $I_q$ 411 to remove high frequency noise that is not related to induced current ripples.

The filtered current from the low pass filter 413 may be provided as input to two substantially parallel processing paths. A first path may include a second order high pass filter 415 that results in $I_q$_ripples 416, which is then normalized at steps 417, 419 to generate $I_q$_ripples_rms 420. A second path may include a second order low pass filter 421 that results in fast_avg_$I_q$ 422, which is further processed at steps 423, 425 to generate $I_q$_avg 426.

For example, along the first path following the first order low pass filter 413, the second order high pass filter 415 may filter out current ripples that may be associated with changes in commanded speed. For example, the second order high pass filter 415 may comprise a 20 Hz high pass filter, in which the 20 Hz cutoff frequency may be selected based on a bandwidth value of a motor speed controller, e.g., approximately 16 Hz. Other example embodiments may include high pass filters having cutoff frequency values that are similarly based on a bandwidth value of a motor speed controller, e.g., a 10 Hz cutoff frequency for a motor speed controller bandwidth of approximately 5 Hz. In this manner, the second order high pass filter 415 may filter or remove current ripples that may result from nominal load transients or changes in commanded speed. The resulting $I_q$_ripples 416 may substantially comprise any current ripples that may be generated due to propeller damage and corresponding induced torque ripples.

Continuing along the first path, $I_q$_ripples 416 may be normalized by taking the absolute value 417 thereof, such that any negative values of the current ripples are converted, flipped, or mirrored to corresponding positive values. The result may then be further processed by a low pass filter 419, e.g., a 5 Hz low pass filter, to generate $I_q$_ripples_rms 420, e.g., rms (root-mean-square) values associated with the current ripples having only positive values. Other example embodiments may include low pass filters having other cutoff frequency values. The steps 417, 419 may therefore generate $I_q$_ripples_rms 420 associated with the induced current ripples without requiring the use of more complicated FFT (Fast Fourier Transforms), harmonic analysis, or other processing techniques, thereby reducing the computational load of the propeller damage detection algorithms described herein.

Along the second path following the first order low pass filter 413, the second order low pass filter 421 may filter out substantially all AC (alternating current) content such that only DC (direct current) values remain, thereby generating fast_avg_$I_q$ 422. For example, the second order low pass filter 421 may comprise a 5 Hz low pass filter, in which the 5 Hz frequency may be selected based on a cutoff frequency of the second order high pass filter 415. Generally, the second order low pass filter 421 may have a cutoff frequency value that is less than the cutoff frequency value of the second order high pass filter 415. Other example embodiments may include second order low pass filters having other cutoff frequency values that are less than a cutoff frequency value of the second order high pass filter. In this manner, the second order low pass filter 421 may filter or remove AC content and leave only DC values. The resulting fast_avg_$I_q$ 422 may substantially comprise fast average DC values of the filtered current from the low pass filter 413.

Continuing along the second path, fast_avg_$I_q$ 422 may be normalized by taking the absolute value 423 thereof, such that any negative values of the fast average DC values are converted, flipped, or mirrored to corresponding positive values. The result may then be further processed by a limiter 425, e.g., a limiter having a range of (5, inf), to generate $I_q$_avg 426, e.g., average current values associated with the fast average DC values having only positive values. The limiter 425 may adjust any values that are lower than the lower limit, i.e., a value of 5 in this example, to equal the lower limit value, and any values that are greater than the upper limit, i.e., a value of infinity in this example, to equal the upper limit. Other example embodiments may include limiters having various other ranges and corresponding lower and upper limit values. The steps 423, 425 may therefore generate $I_q$_avg 426 that removes or replaces small average values, e.g., lower than the lower limit value, as well as very large values, e.g., greater than the upper limit value, to avoid generating erroneous normalized values in the following steps described herein.

Then, the division block 427 may divide $I_q$_ripples_rms 420 by $I_q$_avg 426 to generate $I_q$_normalized_rms 428. In this manner, the rms values associated with the current ripples may be normalized over the average current values associated with the fast average DC values. As a result, the normalization to generate $I_q$_normalized_rms 428 may remove or minimize the load and/or speed dependency of the calculated values.

As set forth herein, the normalization may remove or minimize the dependency between the magnitude and frequency of current ripples and the commanded speed. Thus, propeller damage may be detected without reliance upon complex sets of threshold values that depend on the commanded speed ranges.

The propeller damage detection algorithm may then compare the $I_q$_normalized_rms 428 with one or more threshold values related to current ripples at block 429. In addition, the algorithm may compare the absolute value of the fast_avg_$I_q$ 422 to one or more threshold values related to current average value at block 431. In the example described herein, the threshold values related to current ripples may be approximately 0.4, and the threshold values related to current average value may be approximately 4 A. Other example embodiments may include various other threshold values related to current ripples and/or current average value.

Generally, a higher threshold value for current ripples may cause the algorithm to be less sensitive for detecting propeller damage, whereas a lower threshold value for current ripples may cause the algorithm to generate potentially more false positive determinations of propeller damage. The example threshold value related to current ripples of approximately 0.4 may enable reliable detection of propeller damage, while also substantially ignoring or negating low load conditions that may generate false positive determinations of propeller damage.

In addition, a higher threshold value for current average value may potentially allow or result in motor or aerial vehicle damage due to stress or vibrations from a damaged propeller, whereas a lower threshold value for current average value may cause the algorithm to generate potentially more false positive determinations of propeller damage. The example threshold value related to current average value of approximately 4 A may be associated with a load condition in which the motor is generating minimal thrust and is unlikely to cause damage to the motor or aerial vehicle due to stress or vibrations from a damaged propeller, while also substantially ignoring or negating low load conditions that may generate false positive determinations of propeller damage.

The comparison at block 429 may determine whether the $I_q$_normalized_rms 428 is greater than (or equal to) the threshold value related to current ripples, and the comparison at block 431 may determine whether the absolute value of the fast_avg_$I_q$ 422 is greater than (or equal to) the threshold value related to current average value. Further, the block 433, e.g., a logical AND block, may determine whether both conditions or comparisons of blocks 429 and 431 are met or satisfied.

Further, when both comparisons of blocks 429 and 431 are met or satisfied, block 435, a timing block, may determine whether both conditions or comparisons of blocks 429 and 431 are met or satisfied for a time duration that exceeds or equals a threshold value related to time. In the example described herein, the threshold value related to time may be approximately 5 seconds. Other example embodiments may include various other threshold values related to time.

As set forth herein, the determination of whether the comparisons of blocks 429 and 431 are both met or satisfied for a minimum time duration may remove false positive determinations of propeller damage that may instead be associated with changes in commanded speed or various other normal load or speed transients during normal operations of an aerial vehicle, e.g., with undamaged propellers. Because current ripples that may be induced by changes in commanded speed may have relatively short time durations, the threshold value related to time may prevent or minimize false positive determinations of propeller damage on the basis of such normal load or speed transients during normal operation of an aerial vehicle.

Finally, at block 437, a determination of propeller damage may be made when the comparisons of blocks 429 and 431 are both met or satisfied for a time duration that is longer than the threshold value related to time at block 435.

Using the propeller damage detection algorithm described herein, propeller damage may be more reliably and accurately determined within a short time duration after damage to a propeller, while also reducing the potential of false positive determinations of propeller damage during normal operation of an aerial vehicle. Further, the propeller damage detection algorithm may receive and process measured currents and current ripples without requiring any additional sensors or dedicated hardware, and with relatively low computational load or complexity.

Although the example propeller damage detection algorithm described herein refers to various example values or ranges, other example embodiments may include various other values or ranges for portions of the propeller damage detection algorithm. For example, various other values or ranges may be utilized for bandwidth values of motor speed controllers, cutoff frequency values of filters, lower and upper limit values of limiters, threshold values related to current ripples, current average values, or time, and/or various other values or ranges described herein. In some example embodiments, the various values or ranges of the example algorithm may vary based on the design or attributes of the aerial vehicle, structural components, motors, propellers and/or blades, operating environments or applications of the aerial vehicle, flight or navigation modes or characteristics of the aerial vehicle, and/or various other attributes associated with the aerial vehicle, components thereof, and/or various operational characteristics.

Referring again to FIG. 2, if the induced current 211 is provided as input to the propeller damage detection algorithm, the resulting values for $I_q$_normalized_rms 428 and the absolute values of the fast_avg_$I_q$ 422 may both satisfy the threshold values related to current ripples and current average value at blocks 429 and 431. However, the comparisons at blocks 429 and 431 may not be met or satisfied for a duration that satisfies the threshold value related to time, i.e., at block 435, because of the short duration of the current ripples 212-1, e.g., approximately one second. As a result, the propeller damage detection algorithm may correctly indicate that a propeller is not damaged in response to the current ripples 212-1 associated with changes in commanded speed during normal operation of an aerial vehicle.

In contrast, referring again to FIG. 3B, if the induced current 311 is provided as input to the propeller damage detection algorithm, the resulting values for $I_q$_normalized_rms 428 and the absolute values of the fast_avg_$I_q$ 422 may both satisfy the threshold values related to current ripples and current average value at blocks 429 and 431. In addition, the comparisons at blocks 429 and 431 may be met or satisfied for a duration that satisfies the threshold value related to time, i.e., at block 435, because of the extended duration of the current ripples 312-2. As a result, the propeller damage detection algorithm may correctly indicate that a propeller is damaged in response to the current ripples 312-2 associated with a damaged propeller during operation of an aerial vehicle.

Figure 5:
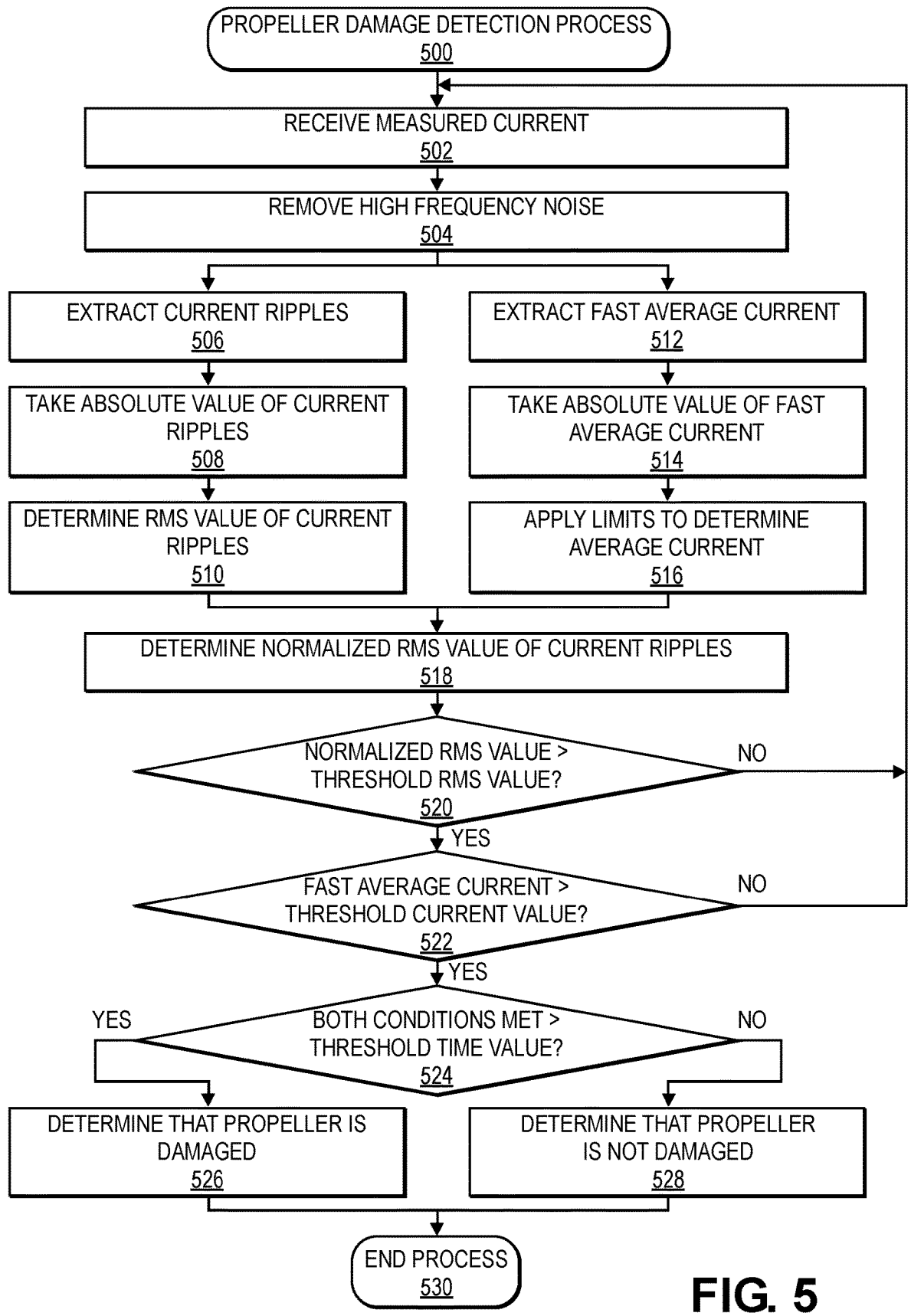
FIG. 5 is a flow diagram illustrating an example propeller damage detection process, in accordance with implementations of the present disclosure.

FIG. 5 is a flow diagram illustrating an example propeller damage detection process 500, in accordance with implementations of the present disclosure.

The process 500 may begin by receiving measured current, as at 502. For example, various currents or phases of currents associated with motor and propeller operation may be measured. In example embodiments, the measured current may comprise a motor quadrature-axis current that is calculated based on measured currents of the motor and propeller. The measured current may include various current ripples, which may be associated with or induced by normal speed or load transients and/or torque ripples due to damaged propellers or blades during operation of an aerial vehicle. Further, a control system may command or instruct receiving the measured current.

The process 500 may continue by removing high frequency noise, as at 504. For example, the measured current may be processed to remove high frequency noise that may not be associated with any current ripples of the measured current. In example embodiments, a first order low pass filter may process or filter the measured current to remove or minimize high frequency noise of the measured current. Further, a control system may command or instruct removing high frequency noise from the measured current.

The process 500 may proceed by extracting current ripples, as at 506. For example, the measured current from which high frequency noise has been removed may be further processed to extract or isolate any current ripples of the measured current. In example embodiments, a second order high pass filter may process or filter the measured current to extract the current ripples. Further, a control system may command or instruct extracting current ripples from the measured current.

The process 500 may continue to take the absolute value of the current ripples, as at 508. For example, the extracted current ripples may be processed to generate absolute values of the current ripples, e.g., converting, flipping, or mirroring any negative values to positive values in example embodiments. Further, a control system may command or instruct taking the absolute value of the extracted current ripples.

The process 500 may proceed to determine an rms value of the current ripples, as at 510. For example, the absolute values of the extracted current ripples may be processed to generate rms (root-mean-square) values of the current ripples. In example embodiments, a low pass filter may process the absolute values of the extracted current ripples to generate the rms values of the current ripples. Further, a control system may command or instruct determining rms values of the extracted current ripples.

Following step 504, the process 500 may also proceed by extracting fast average current, as at 512. For example, the measured current from which high frequency noise has been removed may be further processed to extract or isolate fast average current values of the measured current. In example embodiments, a second order low pass filter may process or filter the measured current to extract DC values of the measured current, while substantially removing AC content from the measured current. Further, a control system may command or instruct extracting fast average current values from the measured current.

The process 500 may continue to take the absolute value of the fast average current, as at 514. For example, the extracted fast average current values may be processed to generate absolute values of the fast average current values, e.g., converting, flipping, or mirroring any negative values to positive values in example embodiments. Further, a control system may command or instruct taking the absolute value of the extracted fast average current values.

The process 500 may proceed to apply limits to determine an average current, as at 516. For example, the absolute values of the extracted fast average current values may be processed to apply lower and/or upper limits to the current values. In example embodiments, a limiter may process the absolute values of the extracted fast average current values to replace any values lower than the lower limit value with the lower limit value, and also to replace any values higher than the upper limit value with the upper limit value. Further, a control system may command or instruct applying limits to determine average current values of the measured current.

Following steps 510 and 516, the process 500 may continue with determining a normalized rms value of the current ripples, as at 518. For example, the rms values of the extracted current ripples and the average current values of the measured current may be processed to generate normalized rms values associated with the current ripples. In example embodiments, the rms values of the extracted current ripples may be divided by the average current values of the measured current to generated normalized rms values of the current ripples. Further, a control system may command or instruct determining normalized rms values of the current ripples.

The process 500 may proceed with determining whether the normalized rms values are greater than one or more threshold rms values, as at 520. For example, the normalized rms values may be compared with a threshold rms value. In example embodiments, it may be determined whether the normalized rms values are greater than (or equal to) a threshold rms value. Further, a control system may command or instruct determining whether the normalized rms values meet or satisfy one or more threshold rms values.

If it is determined that the normalized rms values do not meet or satisfy one or more threshold rms values, the process 500 may return to step 502 to continue to receive measured current.

If, however, it is determined that the normalized rms values meet or satisfy one or more threshold rms values, the process 500 may continue by determining whether the fast average current values are greater than one or more threshold current values, as at 522. For example, the fast average current values may be compared with a threshold current value. In example embodiments, it may be determined whether the fast average current values are greater than (or equal to) a threshold current value. Further, a control system may command or instruct determining whether the fast average current values meet or satisfy one or more threshold current values.

If it is determined that the fast average current values do not meet or satisfy one or more threshold current values, the process 500 may return to step 502 to continue to receive measured current.

If, however, it is determined that the fast average current values meet or satisfy one or more threshold current values, the process 500 may proceed by determining whether both conditions are met for a duration greater than one or more threshold time values, as at 524. For example, it may be determined whether both the normalized rms values meet or satisfy one or more threshold rms values and also the fast average current values meet or satisfy one or more threshold current values for a duration that meets or exceeds a threshold time value. In example embodiments, it may be determined whether both conditions are met or satisfied for a time duration that may be selected to reduce false positive determinations of propeller damage. Further, a control system may command or instruct determining whether both conditions are met for a duration that is greater than one or more threshold time values.

If it is determined that both conditions are not met or satisfied for a duration greater than one or more threshold time values, the process 500 may determine that a propeller is not damaged, as at 528, and the process 500 may end, as at 530. In addition or alternatively, the process 500 may return to step 502 to continue to receive measured current and make subsequent determinations with respect to propeller damage during continued operations of the aerial vehicle.

If, however, it is determined that both conditions are met or satisfied for a duration greater than one or more threshold time values, the process 500 may determine that a propeller is damaged, as at 526, and the process 500 may end, as at 530.

Furthermore, if propeller damage is detected, various mitigation or remediation strategies or processes may be executed or implemented. For example, operation of a motor and damaged propeller may be stopped, and flight or navigation of the aerial vehicle may continue using remaining motors and propellers. In addition, various other control or navigation processes or algorithms may be executed, such as stopping one or more additional motors and propellers, adjusting operational characteristics of one or more motors or propellers, and/or various other modifications or adjustments. Furthermore, a control system may determine whether navigation to a destination location may be safely continued and completed. If safe navigation may not be continued, a safe landing location may be identified or determined, and the control system may instruct flight or navigation of the aerial vehicle to the safe landing location. Various other mitigation or remediation strategies or processes, and/or combinations thereof, may be executed or implemented in response to detection of propeller damage using the system and methods described herein.

Figure 6A:
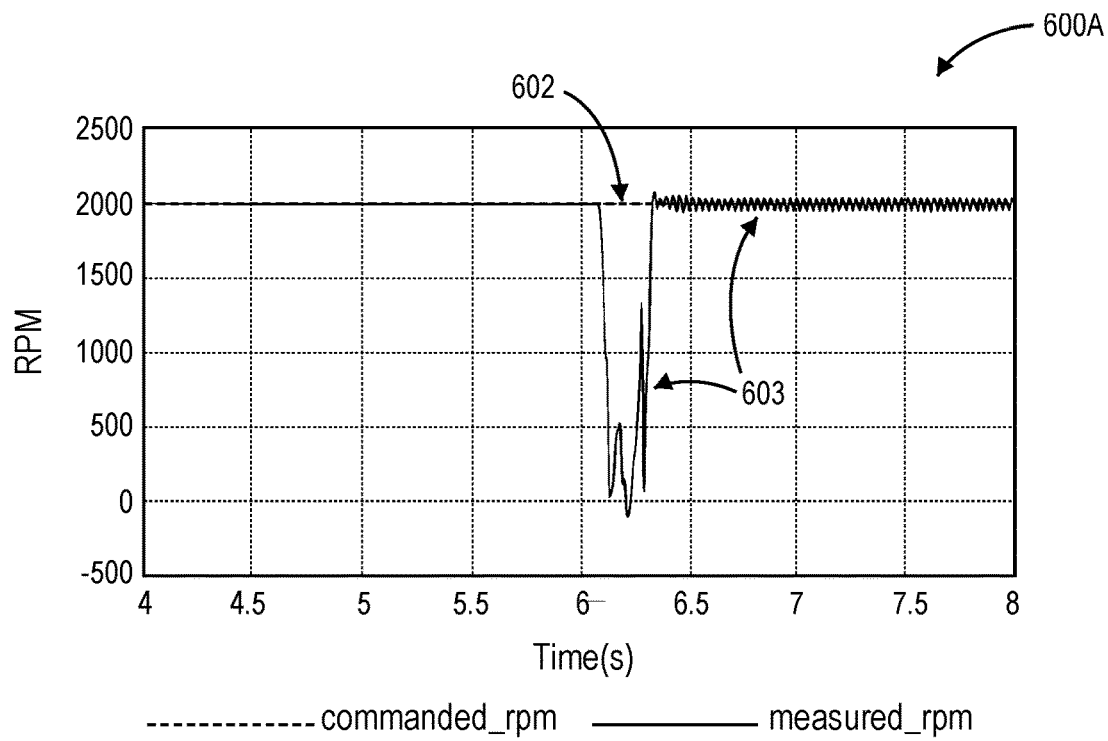
FIG. 6A illustrates an example graph of commanded and measured rpm associated with propeller damage during operation of an aerial vehicle, in accordance with implementations of the present disclosure.

FIG. 6A illustrates an example graph 600A of commanded and measured rpm associated with propeller damage during operation of an aerial vehicle, in accordance with implementations of the present disclosure.

As shown in FIG. 6A, a commanded speed or rpm 602, e.g., approximately 2000 rpm, may be instructed or commanded for a motor and propeller, and a measured speed or rpm 603 may be detected or measured. As illustrated, the measured speed 603 substantially matches or corresponds to the commanded speed 602. However, at a time between 6 and 6.5 seconds in FIG. 6A, there is a sharp drop in the measured speed 603 that may represent an impact upon the propeller by an external object, e.g., an event that causes propeller damage. During the impact, a large speed difference, e.g., a large delta between the commanded speed 602 and the measured speed 603, may be detected. In addition, during the impact, a large or fast rate of change of the measured speed 603 may also be detected.

In additional example embodiments, the detected changes to measured speed 603 relative to commanded speed 602 and/or rates of change of measured speed 603 may be utilized to trigger or initiate the propeller damage detection algorithms, techniques, or processes described herein. For example, if the difference between the measured speed 603 and the commanded speed 602 is greater than one or more threshold speed values, the propeller damage detection algorithm may be initiated. The threshold speed values may include differences greater than approximately 500 rpm, approximately 1000 rpm, approximately 1500 rpm, or other values. In addition, if the rate of change of the measured speed 603 is greater than one or more threshold speed rate of change values, the propeller damage detection algorithm may be initiated. The threshold speed rate of change values may include rates of change greater than approximately 1000 rpm/s, approximately 2000 rpm/s, approximately 5000 rpm/s, approximately 10,000 rpm/s, or other values.

In further example embodiments, when the propeller damage detection algorithms, techniques, or processes are initiated based on detected changes to measured speed 603 relative to commanded speed 602 and/or rates of change of measured speed 603, one or more threshold values associated with the propeller damage detection algorithm may be modified. For example, one or more threshold time values associated with a duration over which both the normalized rms values meet or satisfy one or more threshold rms values and also the fast average current values meet or satisfy one or more threshold current values may be shortened or reduced, in order to determine that a propeller has been damaged. In some examples, the shortened threshold time value may be approximately one second, approximately two seconds, or other values. Because the detected changes to measured speed 603 and/or rates of change of measured speed 603 may indicate impact between the propeller and an external object, the shortened threshold time value may not result in a significant increase in false positive determinations of propeller damage, while also facilitating quick, accurate, and reliable determinations of propeller damage in response to impact events.

Furthermore, in the absence of any detected changes to measured speed 603 relative to commanded speed 602 and/or rates of change of measured speed 603 that meet or exceed one or more respective threshold speed and/or speed rate of change values, the propeller damage detection algorithm may continue operation substantially as described herein at least with respect to FIG. 4.

Figure 6B:
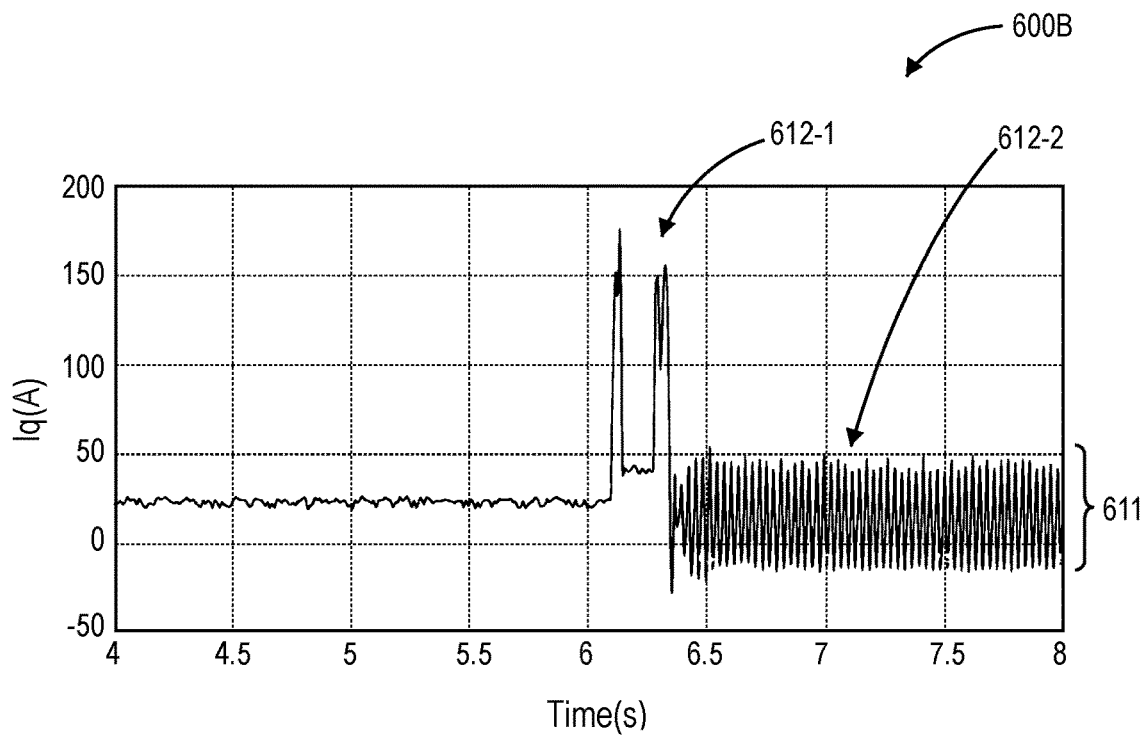
FIG. 6B illustrates an example graph of current ripples associated with propeller damage during operation of an aerial vehicle, in accordance with implementations of the present disclosure.

FIG. 6B illustrates an example graph 600B of current ripples associated with propeller damage during operation of an aerial vehicle, in accordance with implementations of the present disclosure.

As shown in FIG. 6B, induced current 611, including current ripples 612-1, 612-2, may be measured or detected in association with a propeller during operation of an aerial vehicle. As described herein with respect to FIG. 6A, an initial current ripple 612-1 may be detected or measured at a time between 6 and 6.5 seconds in FIG. 6B that may represent an impact upon the propeller by an external object, e.g., an event that causes propeller damage. The initial current ripple 612-1 may result from torque ripples induced on the propeller due to the impact by an external object, as well as motor speed controller commands or instructions to attempt continued operation of the damaged propeller at the commanded speed. The initial current ripple 612-1 associated with the impact upon the propeller may also have a relatively short time duration, e.g., approximately one second, approximately two seconds, etc.

As further illustrated in FIG. 6B, current ripples 612-2 for the damaged propeller may continue to be detected or measured while the measured speed substantially matches or corresponds to the commanded speed. For example, the current ripples 612-2 for the damaged propeller may continue from shortly after the detected impact upon the propeller and until the commanded speed goes to zero. As a result, the current ripples 612-2 may be detected or measured after a detected impact upon the propeller and during substantially steady or continuous operation of a motor and damaged propeller thereafter.

As described herein in example embodiments, the induced current ripples 612-2 may have a magnitude and frequency that vary directly with the commanded speed, e.g., current ripples may have greater magnitude and frequency at higher commanded speeds, and current ripples may have lesser magnitude and frequency at lower commanded speeds. Thus, as further described herein, in order to avoid complex sets of threshold values and to reliably and accurately detect damaged propellers over various speed ranges, the induced current ripples 612-2 may be processed and normalized to substantially remove or minimize the dependence upon commanded speed ranges.

Moreover, the induced current ripples 612-2 during operation of a motor and damaged propeller after a detected impact upon the propeller may have a relatively longer time duration, e.g., greater than approximately two seconds, approximately three seconds, approximately five seconds, greater than approximately seven seconds, or other time durations. For example, as shown in the example graph of FIG. 6B, the induced current ripples 612-2 for the motor and damaged propeller may have a time duration that continues as long as a motor speed controller instructs a commanded speed, e.g., starting from a time of detected impact and extending substantially continuously during further operation of the damaged propeller. Thus, as further described herein, one or more threshold values related to time, e.g., shortened threshold time values after detecting impact upon a propeller, may be applied to the determinations of propeller damage, in order to quickly, reliably, and accurately make determinations of propeller damage in response to impact events during operation of an aerial vehicle.

Figure 7:
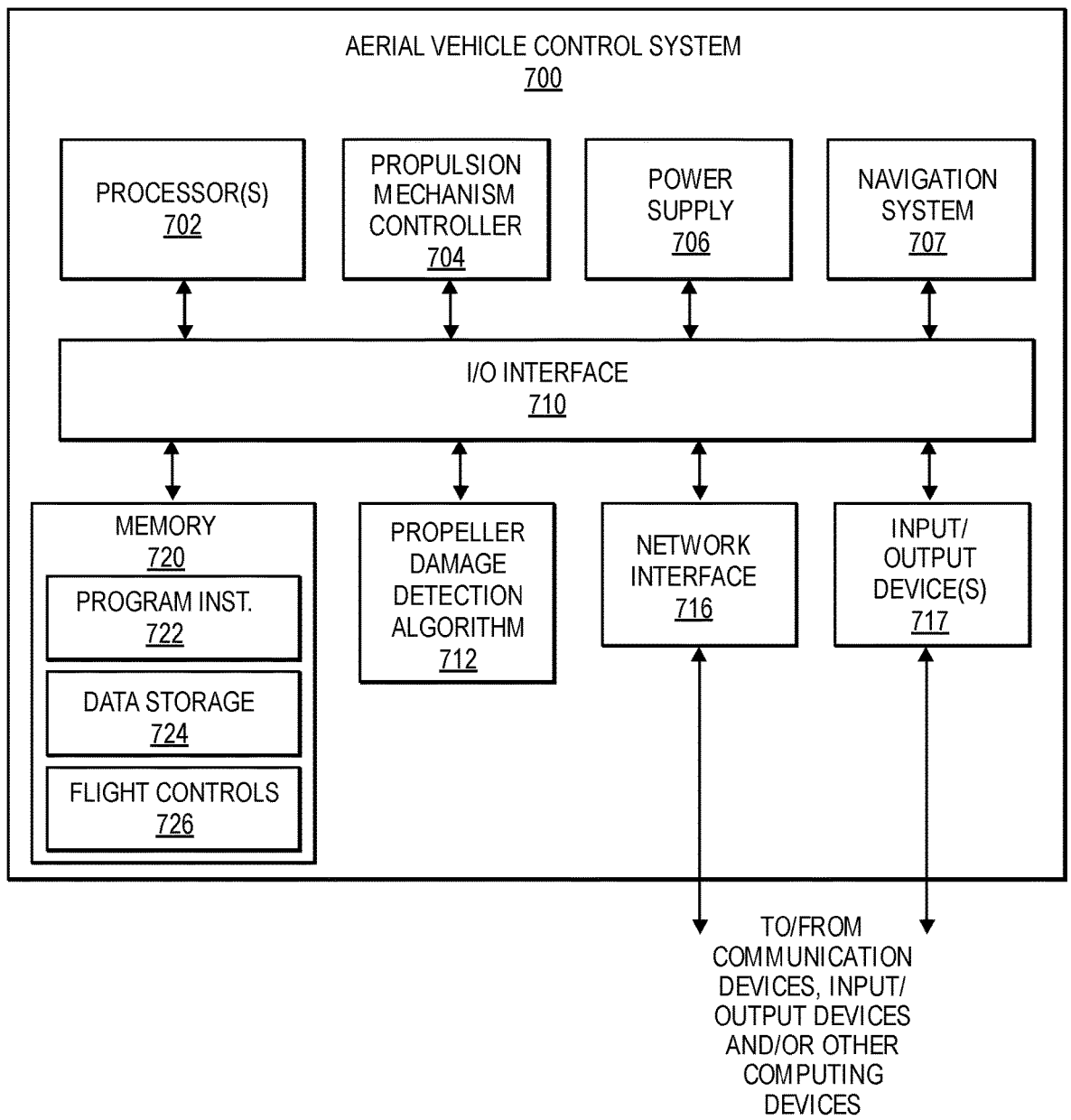
FIG. 7 is a block diagram illustrating various components of an example aerial vehicle control system, in accordance with implementations of the present disclosure.

FIG. 7 is a block diagram illustrating various components of an example aerial vehicle control system 700, in accordance with implementations of the present disclosure.

In various examples, the block diagram may be illustrative of one or more aspects of the aerial vehicle control system 700 that may be used to implement the various systems and processes discussed above. In the illustrated implementation, the aerial vehicle control system 700 includes one or more processors 702, coupled to a non-transitory computer readable storage medium 720 via an input/output (I/O) interface 710. The aerial vehicle control system 700 may also include a propulsion mechanism controller 704, a power supply or battery 706, and/or a navigation system 707. The aerial vehicle control system 700 may further include a propeller damage detection algorithm 712, a network interface 716, and one or more input/output devices 717.

In various implementations, the aerial vehicle control system 700 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, and propeller damage detection algorithm data and/or characteristics, including aerial vehicle data, motor and propeller data, measured currents, current ripples, average current values, normalized current values, various threshold values, and/or other data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724 and flight controls 726, respectively. In other implementations, program instructions, data and/or flight controls data may be received, sent or stored upon different types of computer-accessible media, such as non-transitory media, or on similar media separate from the non-transitory computer readable storage medium 720 or the aerial vehicle control system 700.

Generally, a non-transitory, computer readable storage medium may include storage media or memory media such as magnetic or optical media, e.g., disk or CD/DVD-ROM, coupled to the aerial vehicle control system 700 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface 716 or other peripheral interfaces, such as input/output devices 717. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The propulsion mechanism controller 704 communicates with the navigation system 707 and adjusts the operational characteristics of each propulsion mechanism to guide the aerial vehicle along a determined path and/or to perform other navigational maneuvers. The navigation system 707 may include a GPS or other similar system that can be used to navigate the aerial vehicle to and/or from a location.

The aerial vehicle control system 700 may also include a propeller damage detection algorithm and/or controller 712 that communicates with the processor(s) 702, propeller mechanism controller 704, the non-transitory computer readable storage medium 720, and/or other components or systems described herein to receive and process measured currents and make determinations related to propeller damage based on such processing.

The network interface 716 may be configured to allow data to be exchanged between the aerial vehicle control system 700, other devices attached to a network, such as other computer systems, sensors, and/or control systems of other vehicles, systems, or devices. For example, the network interface 716 may enable wireless communication between numerous aerial vehicles. In various implementations, the network interface 716 may support communication via wireless general data networks, such as a Wi-Fi network. For example, the network interface 716 may support communication via telecommunications networks such as cellular communication networks, satellite networks, and the like.

Input/output devices 717 may, in some implementations, include one or more displays, screens, imaging sensors, thermal sensors, infrared sensors, time of flight sensors, speakers, microphones, accelerometers, pressure sensors, weather sensors, various other sensors, etc. Multiple input/output devices 717 may be present and controlled by the aerial vehicle control system 700. One or more of these sensors may be utilized to assist in performing the various functions, operations, and processes described herein.

As shown in FIG. 7, the memory may include program instructions 722 which may be configured to implement the example processes and/or sub-processes described above. The data storage 724 may include various data stores for maintaining data items that may be provided for performing the various functions, operations, and processes described herein. For example, the data storage 724 may include aerial vehicle data, motor and propeller data, measured currents, current ripples, average current values, normalized current values, various threshold values, and/or other data items.

Those skilled in the art will appreciate that the aerial vehicle control system 700 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The aerial vehicle control system 700 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to aerial vehicles, the disclosed implementations may also be used for other forms of vehicles, including, but not limited to, ground based vehicles and water based vehicles, as well as other systems, machines, or equipment utilizing motors and propellers for which quick, reliable, and accurate propeller damage detection may be advantageous or beneficial.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 5, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "ccould," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to detect damage to a propeller of an aerial vehicle, comprising:
   receiving, by a control system, a motor quadrature-axis current associated with a motor and corresponding propeller of an aerial vehicle;
   removing, by the control system, high frequency noise from the motor quadrature-axis current;
   extracting, by the control system, current ripples from the motor quadrature-axis current;
   determining, by the control system, rms (root-mean-square) values associated with the current ripples;
   extracting, by the control system, fast average current values from the motor quadrature-axis current;
   applying, by the control system, lower and upper limits to the fast average current values to generate average current values;
   calculating, by the control system, normalized rms values based on the rms values associated with the current ripples and the average current values;
   determining, by the control system, that a first condition is satisfied in response to the normalized rms values being greater than a threshold rms value;
   determining, by the control system, that a second condition is satisfied in response to the fast average current values being greater than a threshold average current value;
   determining, by the control system, that the propeller is damaged in response to the first and second conditions being satisfied for a time duration that is greater than a threshold time value; and
   instructing, by the control system, operation of the aerial vehicle based at least in part on the determination that the propeller is damaged.

2. The method of claim 1, further comprising:
   calculating, by the control system, absolute values of the current ripples; and
   wherein the rms values are determined based on the absolute values of the current ripples.

3. The method of claim 1, further comprising:
calculating, by the control system, absolute values of the fast average current values; and
wherein the lower and upper limits are applied to the absolute values of the fast average current values.

4. The method of claim 1, wherein the normalized rms values are calculated by dividing the rms values associated with the current ripples by the average current values.

5. A method, comprising:
extracting, by a control system, current ripples from a motor quadrature-axis current associated with a motor and corresponding propeller of a vehicle;
extracting, by the control system, fast average current values from the motor quadrature-axis current;
calculating, by the control system, normalized rms values based on the current ripples and the fast average current values;
determining, by the control system, that the propeller is damaged in response to a first condition related to the normalized rms values and a second condition related to the fast average current values being satisfied over a time duration; and
instructing, by the control system, operation of the vehicle based at least in part on the determination that the propeller is damaged.

6. The method of claim 5, further comprising:
removing, by the control system, high frequency noise from the motor quadrature-axis current using a first order low pass filter.

7. The method of claim 5, wherein the current ripples are extracted from the motor quadrature-axis current using a second order high pass filter.

8. The method of claim 5, further comprising:
calculating, by the control system, absolute values of the current ripples; and
determining, by the control system, rms (root-mean-square) values using a low pass filter and based on the absolute values of the current ripples;
wherein the normalized rms values are calculated based on the rms values.

9. The method of claim 5, wherein the fast average current values are extracted from the motor quadrature-axis current using a second order low pass filter.

10. The method of claim 5, further comprising:
calculating, by the control system, absolute values of the fast average current values; and
applying, by the control system, lower and upper limits to the absolute values of the fast average current values to generate average current values;
wherein the normalized rms values are calculated based on the average current values.

11. The method of claim 5, further comprising:
determining, by the control system, that the first condition is satisfied in response to the normalized rms values being greater than a threshold rms value.

12. The method of claim 5, further comprising:
determining, by the control system, that the second condition is satisfied in response to the fast average current values being greater than a threshold average current value.

13. The method of claim 5, wherein the propeller is determined to be damaged in response to the first and second conditions being satisfied over the time duration that is greater than a threshold time value.

14. The method of claim 13, further comprising:
detecting at least one of:
a difference between a commanded speed and a measured speed of the motor and corresponding propeller that is greater than a threshold speed value, or
a rate of change of the measured speed of the motor and corresponding propeller that is greater than a threshold speed rate of change value; and
reducing the threshold time value associated with the determination that the propeller is damaged based on the first and second conditions.

15. The method of claim 5, wherein the normalized rms values are calculated to minimize a load or speed dependence of the current ripples.

16. The method of claim 5, wherein the time duration is selected to minimize false positive determinations of propeller damage during normal operation of the motor and the vehicle.

17. An aerial vehicle, comprising:
a fuselage;
a motor arm coupled to the fuselage;
a motor coupled to the motor arm;
a propeller coupled to and rotated by the motor, at least a portion of the motor arm extending within a volume of thrust generation associated with the motor and propeller; and
a control system configured to at least:
extract current ripples from a motor quadrature-axis current associated with the motor;
extract fast average current values from the motor quadrature-axis current;
calculate normalized rms values based on the current ripples and the fast average current values;
determine that the propeller is damaged in response to a first condition related to the normalized rms values and a second condition related to the fast average current values being satisfied over a time duration that is greater than a threshold time value; and
instruct operation of the aerial vehicle based at least in part on the determination that the propeller is damaged.

18. The aerial vehicle of claim 17, wherein the control system is further configured to:
determine that the first condition is satisfied in response to the normalized rms values being greater than a threshold rms value.

19. The aerial vehicle of claim 17, wherein the control system is further configured to:
determine that the second condition is satisfied in response to the fast average current values being greater than a threshold average current value.

20. The aerial vehicle of claim 17, wherein instructing operation of the aerial vehicle based at least in part on the determination that the propeller is damaged comprises at least one of:
stopping operation of the motor coupled the propeller that is damaged;
instructing operation of the aerial vehicle using remaining motors and propellers;
modifying operational characteristics of remaining motors and propellers;
continuing navigation of the aerial vehicle to a destination location;
identifying a safe landing location; or
instructing navigation of the aerial vehicle to the safe landing location.

* * * * *